United States Patent Office 2,931,702
Patented Apr. 5, 1960

2,931,702

METATHESIS OF PLUTONIUM CARRIER LANTHANUM FLUORIDE PRECIPITATE WITH AN ALKALI

Robert B. Duffield, Champaign, Ill., assignor to the United States of America as represented by the United States Atomic Energy Commission No Drawing. Application March 27, 1947
Serial No. 737,723

10 Claims. (Cl. 23—14.5)

This invention relates to a method of separating plutonium from contaminating elements and more specifically relates to a process for concentrating plutonium following its separation from contaminating elements.

The word "plutonium" as used in this specification and claims refers to the element of atomic number 94 and to compounds of this element.

Plutonium is a transuranic element and is equally obtained by the reaction of neutrons with uranium, a reaction which is ordinarily carried out in a neutronic reactor of the "pile" type. As the reaction is usually carried out, natural uranium consisting of $U^{238}$ and 1/139 as much $U^{235}$ is introduced into a chain reactor whereupon under proper conditions the reaction proceeds in the following manner. An atom of $U^{235}$ captures a neutron and fissions to form fission products and two or more neutrons. A neutron is captured by a $U^{238}$ atom to form $U^{239}$ which is an unstable isotope of uranium. $U^{239}$ has a half-life of 23 minutes and decays with beta-emission to form $Np^{239}$ which is also unstable with a half-life of 2.3 days and decays by beta-emission to form $Pu^{239}$.

The fission products formed by the reaction of neutrons with $U^{235}$ and subsequent decay comprise a series of "light" elements with atomic numbers from approximately 35–45 and a series of "heavier" elements with atomic numbers from approximately 51–60. The fission of $U^{235}$ is predominantly binary and the fission products produced are usually unstable and normally decay by beta- and gamma-emission to elements of higher atomic weight which are stable. The half-lives of the fission products vary widely and the radioactivity produced by their decay is extremely dangerous to personnel handling the neutron reacted uranium mass. Because of the extreme radioactivity of the fission products, it is customary to stop the chain reaction in a neutronic reactor while the proportion of fission products and consequently of plutonium to uranium is very small, sometimes as low as several parts per million. The mass of uranium when removed from the neutronic reactor therefore contains only a small percentage of plutonium, neptunium, and fission products. Since neptunium has a half-life of only 2.3 days the majority of the neptunium atoms in the mass may be converted to plutonium simply by aging the mass for a few weeks or months. This aging process also permits the fission products with short half-lives to decay to stable isotopes. It is impractical, however, to age the mass a sufficient length of time to remove much of the radioactivity caused by the decay of fission products, since the majority of the fission products have half-lives ranging from a few days to a year or so.

In order to obtain the plutonium in useful form, it is necessary to separate it from the other components of the uranium mass as it is obtained from the neutronic reactor. The most satisfactory method of separation has been found to be the precipitation method. The precipitation method of separating plutonium from nonvolatile contaminants, normally found in a neutron irradiated mass of uranium, is based on the fact that every such contaminant will react with at least one anion to form a compound which has a solubility which differs from that of a compound formed by the reaction of plutonium in one of its valence states with that anion. Since plutonium is usually present in such small concentrations, it has been found that it is usually impossible to form a precipitate of plutonium directly and it is therefore necessary to use the carrier technique which consists of precipitating plutonium with an inactive compound such as bismuth phosphate or lanthanum fluoride, which will carry plutonium out of solution with it. These carriers are selected so that plutonium is co-precipitated or carried in only one of its oxidation states. The precipitation method of separation is usually arbitrarily divided into four steps: (1) Extraction, in which plutonium and some fission products are separated from uranium and the bulk of the fission products; (2) Decontamination, in which plutonium is separated from the remaining fission products; (3) Concentration, in which the ratio of plutonium to carrier is reduced sufficiently that the plutonium may be precipitated directly from solution, (4) Isolation, in which the plutonium solution is concentrated further and purified.

In the bismuth phosphate-lanthanum fluoride process, which is the most commonly used precipitation process, the extraction step is carried out by co-precipitating the plutonium in an oxidation state of $+4$ or less with bismuth phosphate from a nitric acid solution of the uranium mass. This extraction step separates the plutonium from uranium and the bulk of the fission products but leaves it contaminated with the fission products which form insoluble phosphates, particularly zirconium and columbium. The plutonium is then separated from these fission products, i.e., "decontaminated" by oxidizing the plutonium to its $+6$ valence state, in which state it does not form an insoluble phosphate and then forming a carrier precipitate of bismuth phosphate which removes the fission products from solution. The plutonium is then reduced and the concentration step is next carried out by co-precipitating the plutonium as the fluoride with lanthanum fluoride. The mixture of lanthanum fluoride and plutonium fluoride thus obtained is very insoluble and cannot be dissolved by ordinary means. The method of dissolving this precipitate in the laboratory formerly consisted of boiling the precipitate in concentrated perchloric or sulfuric acid which drives off the fluorine as hydrogen fluoride. It can be readily seen that this method would not be satisfactory for use on a large scale since the reaction would have to be carried on in platinum containers as the hydrogen fluoride is exceedingly corrosive.

The principal object of this invention is to provide a method whereby a relatively insoluble plutonium carrier and associated plutonium may be converted to a readily soluble compound.

An additional object of this invention is to provide a step in the lanthanum fluoride process of plutonium separation whereby the lanthanum fluoride-plutonium carrier is dissolved by less corrosive means.

A still further object is to provide a method whereby a plutonium carrier precipitate may be dissolved in an aqueous solution to furnish a solution containing plutonium in such concentration that a plutonium compound may be precipitated directly from the solution without a carrier.

Other objects and advantages of the invention will become apparent from the following detailed description.

I have discovered that these objects may be accomplished by the metathesis of a lanthanum fluoride carrier containing plutonium with an alkali metal hydroxide to form a mixed hydroxide of plutonium and lanthanum. This mixed hydroxide may be readily separated from solution and will easily dissolve in a small amount of an acid solution.

This process of this invention is not complicated and may be carried out in several different ways. The lanthanum fluoride carrier precipitate containing plutonium may be metathesized directly with an alkali metal hydroxide without dissolution of the lanthanum-plutonium fluoride. The hydroxide ions replace the fluoride ions in the precipitate, leaving an insoluble precipitate of lanthanum-plutonium hydroxide in the solution and the alkali metal ions and fluoride ions in the supernatant fluid. The hydroxide precipitate may be separated from the solution by the usual means and any remaining trace of alkali metal fluoride may be readily washed away from the precipitate. The precipitate can then be easily dissolved in an acid solution.

It will be readily apparent that the use of the process of this invention in dissolving a plutonium carrier precipitate of lanthanum fluoride has great advantages over the methods formerly used. The plutonium fluoride may be quickly and easily converted to a plutonium compound, which is readily soluble in an inorganic acid solution. The reagents used in the conversion are inexpensive and readily obtainable. The formation of gaseous hydrogen fluoride, which is an exceedingly dangerous and corrosive gas is avoided by the use of the process of this invention and consequently the platinum reacting vessels needed in the method formerly used may be dispensed with. The process may be carried out where plutonium is present in extremely dilute concentrations, since the lanthanum hydroxide which is co-precipitated with plutonium hydroxide carries plutonium hydroxide quantitatively from solution. The volume of plutonium carrier solution is greatly reduced by this operation. A reduction to 3.6% by volume may be effected or 7.5% by weight. An added advantage of this process when a nitric acid solution is used as the acid solution in which the hydroxide precipitate is dissolved is the completeness with which the plutonium may be dissolved by the nitric acid solution. This is based upon the fact that a lanthanum-plutonium fluoride carrier precipitate is slightly soluble in a nitric acid solution so that any trace of the lanthanum fluoride carrier which is not metathesized to the hydroxide by the first steps in the treatment will be present in such a low concentration that it may still be dissolved by the nitric acid in the final dissolution of the lanthanum hydroxide carrier.

One embodiment of my invention is concerned with the direct metathesis of an insoluble lanthanum fluoride carrier containing plutonium to the hydroxide by the action of potassium hydroxide. In this embodiment a lanthanum fluoride carrier precipiatte with its accompanying plutonium fluoride is slurried with water or a dilute acid solution and then treated with potassium hydroxide. As a result of this treatment the mixed lanthanum and plutonium fluorides are converted, without dissolution, to the corresponding lanthanum and plutonium hydroxides. These hydroxides are then separated from the solution and washed to free them from any fluoride ions remaining and the precipitate is then dissolved in a dilute nitric acid solution.

The lanthanum fluoride plutonium carrier precipitate is finely divided and in order to make separation easier it may be desirable to treat the fluoride with flocculating agents. The fluoride precipitate may be washed prior to the reaction with the hydroxide, although this is not necessary and may be dispensed with. The treatment of the fluorides prior to the metathesis by the process of this invention seems to have little effect upon the efficiency of the metathesis. Numerous experiments have been carried on to determine whether such variations in the separation process prior to metathesis such as the methods of oxidating and reducing the plutonium and the methods of precipitating and concentrating the lanthanum fluoride carrier have any effect upon the process of this invention. These experiments have uniformly shown that metathesis by the process of this invention is uniformly efficient without regard to prior treatment of the plutonium. However, when $Fe^{+2}$ ions are present in any substantial quantity, while they do not interfere with the metathesis of the fluorides and subsequent dissolution of the lanthanum and plutonium hydroxides, they may, however, make a substantial difference in the isolation steps which normally follow the process of my invention in a separation process. If the isolation step includes an $H_2O_2$ precipitation of the $Pu^{+4}$ at an elevated temperature the presence of Fe ions in concentration greater than 0.01 M may increase the $PuO_4$ solubility. Thus, in cases where Fe ions are present in concentrations as great as 0.01 M in the lanthanum fluoride carrier and the plutonium is to be precipitated as the peroxide following the metathesis process, it may be desirable to separate the Fe ions by any suitable step such as a sulfide precipitation prior to or during the metathesis process.

Concentration of the KOH used may vary widely. In order, however, to obtain the maximum speed of reaction it has been found desirable to use a concentration of between 10 and 20% KOH. This, of course, applies to the total KOH concentration of the solution formed by the mixture of KOH with the lanthanum fluoride carrier slurry. The KOH may be added to the lanthanum fluoride slurry as either the solid or as a solution of any convenient strength. The speed of reaction also varies somewhat with the temperature with which the reaction is carried on, as it has been found that at room temperature the reaction may proceed very slowly. Numerous experiments have disclosed that it is advisable to maintain the mixture of the reacting solutions at a temperature of not less than 75° C. with 80° C. giving optimum results. With 15% KOH and reaction carried on at 80° C., it has been found desirable in order to insure complete metathesis to maintain the potassium hydroxide in contact with the lanthanum fluoride carrier for not less than 60 minutes and preferably for 90 minutes. Experiments to determine optimum conditions for use of the process of this invention in plant level operations have been carried out and these experiments are summarized in the four tables which follow.

TABLE 1

Conversion during metathesis vs. time

| Time, Hours | Percent Pu Oxidized by Zr-free $Cr_2O_7^-$ After Metathesis |
| --- | --- |
| ½ | 9.1 |
| 1 | 17.0 |
| 2 | 99.2 |

TABLE 2

Time of metathesis vs. percent oxidation

| Percent KOH | Time of Metathesis (minutes) | Percent Pu Oxidized by Zr-free $Cr_2O_7^-$ After Metathesis |
| --- | --- | --- |
| 15 | 20 | 40 |
|  | 40 | 75 |
|  | 60 | 75 |
|  | 80 | 97 |
|  | 100 | 98 |

TABLE 3

KOH concentration vs. percent oxidation

| Percent KOH During Metathesis | Percent Pu Oxidized by Zr-free $Cr_2O_7^=$ After Metathesis |
|---|---|
| 7.5 | 17 |
| 10 | 98 |
| 15 | 99 |
| 20 | 98 |

TABLE 4

Effect of KOH concentration and temperature on metathesis

| Percent KOH During Metathesis | Percent Pu Oxidized by Zr-free $Cr_2O_7^=$ After Metathesis At— | | |
|---|---|---|---|
| | 50° C. | 75° C. | 95° C. |
| 7.5 | 16.2 | 82.7 | 97.5 |
| 10 | 21.8 | 99.4 | 99.5 |
| 15 | 99.4 | 99.6 | 99.5 |

Although the above tables have been given to show the effect of variations in time, temperature, and concentrations, at which the process is carried out, it is to be understood that the range of these variables applies only to the rate of reaction, or the completeness with which the metathesis step of my process will take place within a given time. It has been shown that the reaction will go to completion within a much wider range of temperature and concentrations, provided the reactants are maintained in contact a sufficient period of time. This is in accord with theoretical considerations, since the difference in the equilibrium constants of $La(OH)_3$ and $LaF_3$ is a factor of $10^{12}$ in favor of $La(OH)_3$.

The process of this invention is extremely flexible as to the equipment in which it may be carried out. Thus, the metathesis reaction may be carried out in a centrifuge bowl, in a tank or in any other suitable apparatus. In large scale operations combinations of the centrifuge and tank reactors have been found to be desirable. The effect of agitation upon the metathesis reaction has been tested and it has been found that substantially complete metathesis may be accomplished without the use of agitation, but the time for complete reaction may be shortened somewhat if agitation is used.

In order to completely remove the fluoride ion from the hydroxide precipitate so that the lanthanum fluoride precipitate will not reform upon acidification of the hydroxide, it has been found desirable to thoroughly wash the hydroxide precipitate following its separation from the supernatant liquid. The number of washes necessary are dependent somewhat upon the method and apparatus by which the metathesis is carried out, but it has been found that in large scale operation a single thorough wash carried out in the centrifuge bowl is sufficient. It has been found that there is some possibility of peptization of the hydroxide precipitate if a water wash is used. However, this peptization may be avoided by the use of a 1 to 2½% KOH wash with about a 2% KOH wash preferable. The lanthanum fluoride-plutonium hydroxide cake obtained by the process of this invention is readily soluble in a strong inorganic acid solution which will form a water-soluble compound with lanthanum and plutonium such as $HNO_3$, $H_2SO_4$, HCl, HBr or such a mixture of acids as 0.8 N $HNO_3$–0.2 $H_2SO_4$. Where the process of this invention is followed by an isolation step dependent upon the peroxide precipitation of plutonium, it has been found desirable to dissolve the hydroxide cake in nitric acid solution since the nitrate ions interfere less with subsequent steps in the normal separation process than anions of some other acids. The quantity of nitric acid used should be sufficient to (1) neutralize the 2% KOH heel and (2) to convert the lanthanum hydroxide and plutonium hydroxide to the corresponding nitrates. If the nitric acid concentration is below 0.5 N there is danger of hydrolysis or formation of the polymerized form of plutonium. The hydroxides may be dissolved by the addition of concentrated acid such as 60% $HNO_3$ to the precipitate and centrifuge heel, and following dissolution of the hydroxides, the solution diluted to the desired $HNO_3$ concentration. In order to insure complete solution it has been found desirable when the reaction is carried on in a centrifuge bowl to do extensive slurrying and use centrifuge ploughs. The use of nitric acid has been found desirable for the final dissolution step in that if any minute proportion of the lanthanum fluoride-plutonium fluoride has not been metathesized by the metathesis step, it will probably be in such low concentration that it will dissolve in nitric acid solution.

The use of the process of this invention in metathesizing an insoluble lanthanum fluoride plutonium carrier to a soluble lanthanum compound may be illustrated with the following example:

Example 1

Twenty-eight cc. of $LaF_3$ slurry containing 0.1 g. of La and $3.62 \times 10^{-4}$ g. of Pu was made 10% in KOH by the addition of KOH. This solution was agitated for 60 minutes at 75° C. and then centrifuged. After centrifuging the supernatant liquid was decanted off and the $La(OH)_3$ washed four times with 1.12 cc. $H_2O$ each time, with 15 minutes agitation at room temperature for each washing. The $La(OH)_3$ was then dissolved in 1.12 cc. 60% $HNO_3$. This solution was analyzed for plutonium carried and it was found that 98.8% of the plutonium had carried and was dissolved in the nitric acid solution. Theoretically two washings would have been enough to reduce the fluoride ion to a point at which no $LaF_3$ would precipitate, but four washings were used so that results would reflect the degree of metathesis rather than completeness of washing.

The process of this invention with a KOH metathesizing agent may also be illustrated with the following example showing plant operation.

Example 2

A slurry of 10 gals. of 1 N nitric acid solution containing 5.5 lbs. of lanthanum fluoride and 0.85 lb. of plutonium fluoride was placed in a tank. This slurry was then diluted with 700 lbs. of $H_2O$. Three hundred sixty-one lbs. of 50% by weight KOH were added to the metathesizer tank and the temperature brought to 90° C. and agitation commenced in unit. An additional 361 lbs. of KOH solution were then added. Seven hundred lbs. of water were added bringing contents of tank to 2400 lbs. Temperature of solution in metathesizer was then adjusted to 80° C. and the solution was agitated for 90 minutes at that temperature. The solution was then allowed to cool to 35° C. and centrifuged by introducing slurry at a rate of 12 lbs. per minute into a 40-inch centrifuge operating at 1800 r.p.m. Upon completion of centrifugation the centrifuge was slowed to 900 r.p.m. and bowl skimmed to 5 gals. Lanthanum hydroxide cake containing plutonium was then broken up in the centrifuge bowl and transferred as a slurry to a tank reactor unit by adding 450 lbs. of water to the bowl in two equal portions and jetting slurry to the reactor unit. Bowl of centrifuge unit was washed with water and wash jetted to the reactor bringing the weight of the hydroxide slurry in the reactor unit to 1600 lbs. Two hundred fifty lbs. of 17% potassium hydroxide solution were then added to reactor unit containing hydroxide slurry and water sufficient to bring contents of reactor unit to 2100 lbs. The hydroxide slurry was then brought to a temperature of 35° C. and agitated for one hour. The combined plutonium-lanthanum hydroxide was then separated from the wash by transferring the hydroxide slurry at a rate of 25 lbs. per minute to a centrifuge operated at 1800 r.p.m. with the supernatant fluid going to waste. Upon completion of the centrifugation of the lanthanum-plutonium hydroxides the centrifuge bowl was skimmed to 3 gals. and 24 lbs. of 60% $HNO_3$ were added to the bowl and agitated until the hydroxides were completely dissolved. Water was then added to this solution to bring it to a total weight of 72 lbs. or approximately 8 gals. of solution. This solution contained 8.76 lbs. lanthanum nitrate and 1.27 lbs. of plutonium nitrate.

Although the KOH metathesis step described above has been found to be the simplest embodiment and an entirely adequate procedure for achieving the objects set forth above, there may be many variations of this process without departing from the spirit of the invention. For example, sodium hydroxide may be used as the metathesizing agent and its use is illustrated in the following example.

Example 3

A precipitate of 200 micrograms lanthanum fluoride containing 2 micrograms of plutonium was washed with dilute hydrofluoric acid and 50 microliters of 1 M sodium hydroxide were added to the lanthanum fluoride-plutonium carrier. The sodium hydroxide was permitted to remain in contact with the lanthanum fluoride for 10 minutes and the resulting insoluble lanthanum and plutonium hydroxides were separated by centrifugation. This precipitate was washed with a dilute sodium hydroxide wash and the hydroxide precipitated and dissolved in 2 N nitric acid. Analysis of the resulting solution disclosed that better than 99% of the plutonium had carried.

Although the embodiments of this invention which employ potassium or sodium hydroxide as the metathesizing agent have been found to be the simplest and entirely satisfactory for normal operations, it was found that under certain specialized conditions a metathesizing agent comprised of a mixed alkali metal carbonate-alkali metal hydroxide gave very desirable results. Thus, where it was desired to dissolve the metathesized lanthanum carrier in a smaller amount of nitric acid than ordinarily used, or where an abnormally high percentage of impurities inherent to plant operation was contained in the lanthanum fluoride carrier precipitate, it was found that a metathesizing agent composed of an aqueous solution containing 10% $K_2CO_3$—15% KOH gave exceptionally favorable results. The use of this metathesizing agent tends to solubilize the objectional impurities to the extent that they are discarded in the metathesis waste and a more complete solution of the final lanthanum hydroxide carrier cake can be obtained. The process of this invention is the same whether a straight alkali hydroxide metathesizing agent is used or a mixture of alkali hydroxide and alkali carbonate. The variables caused by variation in time and temperature at which the reaction takes place are approximately the same as those previously set forth in the first embodiment of my invention described above. It is necessary that the KOH concentration in the lanthanum fluoride carrier slurry be sufficient to produce complete metathesis of the lanthanum and plutonium fluorides to the hydroxides, in the presence of the carbonate ion. It has been found, however, that with the 5 to 20% $K_2CO_3$ concentrations usually used in this embodiment, the KOH concentration of 10 to 20% normally used in the straight KOH metathesis embodiment described gives complete metathesis, and the results achieved within this KOH range indicated that the $K_2CO_3$ concentration within the 5 to 20% range has little effect on the concentration of KOH needed to effect metathesis. The product loss in this embodiment of my invention may be somewhat higher than in my first embodiment unless the waste obtained in the first centrifugation is re-worked. This may readily be accomplished by adding approximately 30 mg. per liter of extra lanthanum to the waste and re-centrifuging. The lanthanum may be added as any soluble lanthanum salt but is preferably added as the lanthanum nitrate. The precipitate thus obtained is added to the lanthanum hydroxide carrier obtained in the first centrifugation. This embodiment of my invention may be illustrated by the following example.

Example 4

The lanthanum and potassium fluorides are received in the metathesizer unit as 100 gals. of aqueous slurry containing the equivalent of 2.48 lbs. of lanthanum and 250 g. of plutonium. The agitator is started upon receipt of the slurry and water is added to adjust the volume to 216 gallons. Solid 85% KOH and solid $K_2CO_3$ are added, with constant agitation, in quantities sufficient to make the slurry 15% by weight in KOH and 10% by weight in $K_2CO_3$. The slurry is heated to 80° C. and maintained at this temperature for 90 minutes following which it is cooled to at least 35° C. The precipitate of lanthanum and plutonium hydroxides is then separated from the solution by centrifuging at 1800 r.p.m. The effluent may be carried through a second metathesizing cycle if desired.

To accomplish this second methathesis cycle the skimmings and original effluent are returned from the centrifugation to the metathesizer unit. A quantity of 1% $La(NO_3)_3 \cdot 2NH_4NO_3 \cdot 4H_2O$ salt equivalent to 30 mg. per liter of lanthanum is added to the solution at room temperature over a period of 15 minutes. Agitation is continued during the period of addition and for 30 minutes thereafter. This slurry is then recentrifuged and the precipitate added to the original precipitate. The combined precipitates are washed in a tank with 2% KOH solution for one hour at about 35° C. The washed precipitate is separated from the wash water by centrifugation and dissolved in an acid solution by adding 1.25 gals. of 60% $HNO_3$ to the hydrixide cake in a centrifuge bowl and slurry for 30 minutes. The product solution should occupy a volume of 8 gals. with nitric acid concentration of 1 N, $La^{+3}$ concentration of 37 g./l. and $Pu^{+4}$ concentration of approximately 8.25 g./l.

While there have been described certain embodiments of my invention it is to be understood that it is capable of many modifications. For example, the embodiments, shown by the examples above, have described the conversion of an insoluble plutonium fluoride to a soluble plutonium hydroxide with the steps of the process being carried out with a lanthanum carrier. It is to be understood that the process may be carried out with equally good results with a plutonium fluoride uncontaminated by carrier when the plutonium is in sufficient concentration and it will form precipitates without a carrier. As to the reagents used in the metathesis steps of my process, the hydroxide or carbonate of sodium may be used in place of the potassium basic salts. Changes, therefore, may be made without departing from the spirit and scope of the invention as described in the appended claims.

It is the intention to claim all novelties of invention as broadly as possible in view of the prior art.

What is claimed is:

1. The method of converting a plutonium fluoride compound to a plutonium compound soluble in an acid solution which consists in contacting the plutonium fluoride compound with an aqueous alkali metal hydroxide solution for at least one hour and separating the resultant plutonium hydroxide precipitate from said solution.

2. The method of converting a lanthanum fluoride carrier precipitate containing plutonium to a lanthanum carrier compound containing plutonium soluble in an acid solution which consists in contacting said lanthanum fluoride carrier precipitate containing plutonium with an aqueous alkali metal hydroxide solution for at least one hour, to metathesize said carrier with its entrained plutonium to the hydroxide.

3. The method of converting a lanthanum fluoride carrier precipitate containing plutonium to a compound soluble in nitric acid which consists in contacting an aqueous slurry of said lanthanum fluoride carrier containing plutonium with an alkali metal hydroxide for at least one hour.

4. The method of converting a lanthanum fluoride carrier containing plutonium to a compound soluble in a nitric acid solution which consists in contacting an aqueous slurry of said lanthanum fluoride carrier containing plutonium with sodium hydroxide for at least one hour.

5. The method of converting a lanthanum fluoride carrier containing plutonium to a composition soluble in a nitric acid solution which consists in contacting an aqueous slurry of said lanthanum-plutonium fluoride precipitate with KOH solution to produce at least 10% concentration of KOH in the slurry and agitating the resulting slurry for longer than 30 minutes at a temperature of greater than 60° C., then separating the resultant lanthanum-plutonium hydroxide precipitate.

6. In a process for recovering plutonium from foreign products wherein a carrier precipitate of lanthanum fluoride containing plutonium is obtained, the steps which consist in contacting said carrier precipitate with an aqueous alkali metal hydroxide solution for at least one hour to metathesize said precipitate to the hydroxide, separating said hydroxide precipitate and then dissolving the lanthanum hydroxide-plutonium carrier precipitate in a solution of a strong inorganic acid which forms water-soluble salts with lanthanum and plutonium.

7. In a process for recovering plutonium from foreign products wherein a carrier precipitate of lanthanum fluoride containing plutonium is obtained, the steps which consist in contacting said carrier precipitate with an aqueous alkali metal hydroxide solution for at least one hour to metathesize the lanthanum fluoride carrier containing plutonium to a lanthanum hydroxide carrier containing plutonium, separating the hydroxide precipitate thus formed, washing the precipitate with an aqueous medium then dissolving the precipitate in a solution of a strong inorganic acid, which forms water-soluble salts with plutonuim and lanthanum.

8. The process of claim 7 in which the alkali metal hydroxide is potassium hydroxide.

9. The process of claim 7 in which the alkali metal hydroxide is sodium hydroxide.

10. In a process for recovering plutonium from foreign products wherein a carrier precipitate of lanthanum fluoride containing plutonium is obtained, the steps which consist in contacting said lanthanum fluoride carrier with a KOH solution in which the KOH concentration is between 10 and 20%, maintaining the reactants in contact at a temperature of not less than 60° C. for a period of not less than 60 minutes, separating the resulting hydroxide precipitate, washing the precipitate with a dilute aqueous KOH solution, then dissolving the said hydroxide precipitate in a nitric acid solution, in which the nitric acid is present in a concentration not less than 0.5 N.

References Cited in the file of this patent

UNITED STATES PATENTS

| | | |
|---|---|---|
| 2,768,871 | Brown et al. | Oct. 30, 1956 |
| 2,776,185 | Werner et al. | Jan. 1, 1957 |
| 2,785,951 | Thompson et al. | Mar. 19, 1957 |
| 2,875,022 | Faris | Feb. 24, 1959 |
| 2,891,841 | Ritter | June 23, 1959 |
| 2,894,812 | Duffield | July 14, 1959 |